(12) United States Patent
Farrell et al.

(10) Patent No.: US 8,505,278 B2
(45) Date of Patent: Aug. 13, 2013

(54) ENGINE SYSTEM PROPERTIES CONTROLLER

(75) Inventors: Lisa A. Farrell, Columbus, IN (US); Timothy R. Frazier, Columbus, IN (US); Hasan Mohammed, Bloomington, IN (US)

(73) Assignee: Cummins IP, Inc., Minneapolis, MN (US)

( * ) Notice: Subject to any disclaimer, the term of this patent is extended or adjusted under 35 U.S.C. 154(b) by 737 days.

(21) Appl. No.: 12/433,730

(22) Filed: Apr. 30, 2009

(65) Prior Publication Data

US 2010/0275583 A1 Nov. 4, 2010

(51) Int. Cl.
*F01N 3/02* (2006.01)
*F01N 3/20* (2006.01)

(52) U.S. Cl.
USPC ................ 60/285; 60/286; 60/295

(58) Field of Classification Search
USPC .................... 60/285, 286, 295
See application file for complete search history.

(56) References Cited

U.S. PATENT DOCUMENTS

| | | | |
|---|---|---|---|
| 4,314,345 A | 2/1982 | Shiraishi et al. |
| 5,552,128 A | 9/1996 | Chang et al. |
| 5,809,775 A | 9/1998 | Tarabulski et al. |
| 6,109,024 A | 8/2000 | Kinugasa et al. |
| 6,125,629 A | 10/2000 | Patchett |
| 6,182,443 B1 | 2/2001 | Jarvis et al. |
| 6,266,955 B1 | 7/2001 | Liang et al. |
| 6,269,633 B1 | 8/2001 | van Nieuwstadt et al. |
| 6,295,809 B1 | 10/2001 | Hammerle et al. |
| 6,311,484 B1 | 11/2001 | Roth et al. |
| 6,375,828 B2 | 4/2002 | Ando et al. |
| 6,415,602 B1 | 7/2002 | Patchett et al. |
| 6,446,430 B1 | 9/2002 | Roth et al. |
| 6,546,720 B2 | 4/2003 | van Nieuwstadt |
| 6,581,374 B2 | 6/2003 | Patchett et al. |
| 6,662,553 B2 | 12/2003 | Patchett et al. |

(Continued)

FOREIGN PATENT DOCUMENTS

| | | |
|---|---|---|
| CN | 1804378 A | 7/2006 |
| CN | 1809685 A | 7/2006 |

(Continued)

OTHER PUBLICATIONS

PCT/US2009/042419, International Search Report and Written Opinion, Jan. 27, 2010.

(Continued)

*Primary Examiner* — Kenneth Bomberg
*Assistant Examiner* — Dapinder Singh
(74) *Attorney, Agent, or Firm* — Kunzler Law Group, PC (57) ABSTRACT

Various embodiments of an apparatus, system, and method are disclosed for manipulating the properties of engine exhaust at least partially through the engine's control system to increase the efficiency and performance of the exhaust aftertreatment system. According to one representative embodiment, an engine system properties controller includes an exhaust aftertreatment system module, a powertrain module, and a combustion module. The exhaust aftertreatment system module is configured to generate an exhaust conditions vector request. The powertrain module is configured to receive the exhaust conditions vector request from the exhaust aftertreatment system module and generate at least one engine operating condition target based on the exhaust conditions vector request. The combustion module is configured to receive the at least one engine operating condition target and generate at least one engine controls command based on the at least one engine operating condition target.

19 Claims, 7 Drawing Sheets

(56) References Cited

U.S. PATENT DOCUMENTS

| | | |
|---|---|---|
| 6,701,707 B1 | 3/2004 | Upadhyay et al. |
| 6,713,030 B1 | 3/2004 | Chandler et al. |
| 6,742,326 B2 | 6/2004 | Xu et al. |
| 6,742,330 B2 | 6/2004 | Genderen |
| 6,829,885 B2 | 12/2004 | Surnilla et al. |
| 6,882,929 B2 | 4/2005 | Liang et al. |
| 6,892,530 B2 | 5/2005 | Montreuil et al. |
| 6,901,745 B2 | 6/2005 | Schnaibel et al. |
| 6,928,806 B2 | 8/2005 | Tennison et al. |
| 6,981,368 B2 | 1/2006 | van Nieuwstadt et al. |
| 6,993,900 B2 | 2/2006 | Upadhyay et al. |
| 7,017,389 B2 | 3/2006 | Gouma |
| 7,063,642 B1 | 6/2006 | Hu et al. |
| 7,093,427 B2 | 8/2006 | van Nieuwstadt et al. |
| 7,113,835 B2 | 9/2006 | Boyden et al. |
| 7,117,046 B2 | 10/2006 | Boyden et al. |
| 7,134,273 B2 | 11/2006 | Mazur et al. |
| 7,150,145 B2 | 12/2006 | Patchett et al. |
| 7,168,243 B2 | 1/2007 | Endicott et al. |
| 7,178,328 B2 | 2/2007 | Solbrig |
| 7,204,081 B2 | 4/2007 | Yasui et al. |
| 7,213,395 B2 | 5/2007 | Hu et al. |
| 7,263,825 B1* | 9/2007 | Wills et al. .............. 60/295 |
| 7,293,410 B2* | 11/2007 | Miura .............. 60/295 |
| 7,320,781 B2 | 1/2008 | Lambert et al. |
| 7,332,135 B2 | 2/2008 | Gandhi et al. |
| 7,485,272 B2 | 2/2009 | Driscoll et al. |
| 7,603,846 B2 | 10/2009 | Lueders et al. |
| 7,628,009 B2 | 12/2009 | Hu et al. |
| 7,631,490 B2 | 12/2009 | Colignon |
| 7,650,746 B2 | 1/2010 | Hu et al. |
| 7,685,813 B2 | 3/2010 | McCarthy, Jr. |
| 7,802,419 B2 | 9/2010 | Doring |
| 7,832,200 B2 | 11/2010 | Kesse et al. |
| 7,861,518 B2* | 1/2011 | Federle .............. 60/286 |
| 7,892,508 B2 | 2/2011 | Katoh |
| 7,950,222 B2* | 5/2011 | Hodzen .............. 60/276 |
| 7,997,070 B2 | 8/2011 | Yasui et al. |
| 8,020,374 B2 | 9/2011 | Walz et al. |
| 8,061,126 B2 | 11/2011 | Gady et al. |
| 8,074,445 B2 | 12/2011 | Ofoli et al. |
| 2002/0044897 A1 | 4/2002 | Kakwani et al. |
| 2003/0177766 A1* | 9/2003 | Wang et al. .............. 60/602 |
| 2003/0182935 A1 | 10/2003 | Kawai et al. |
| 2004/0098968 A1 | 5/2004 | van Nieuwstadt et al. |
| 2004/0112046 A1 | 6/2004 | Tumate et al. |
| 2004/0128982 A1 | 7/2004 | Patchett et al. |
| 2005/0260761 A1 | 11/2005 | Lanier et al. |
| 2005/0282285 A1 | 12/2005 | Radhamohan et al. |
| 2006/0086080 A1 | 4/2006 | Katogi et al. |
| 2006/0130458 A1 | 6/2006 | Solbrig |
| 2006/0144038 A1* | 7/2006 | Miura .............. 60/286 |
| 2006/0155486 A1 | 7/2006 | Walsh et al. |
| 2006/0212140 A1* | 9/2006 | Brackney .............. 700/29 |
| 2007/0044456 A1 | 3/2007 | Upadhyay et al. |
| 2007/0137181 A1 | 6/2007 | Upadhyay et al. |
| 2007/0137184 A1 | 6/2007 | Patchett et al. |
| 2007/0163244 A1 | 7/2007 | Federle |
| 2007/0214777 A1 | 9/2007 | Allansson et al. |
| 2007/0295003 A1 | 12/2007 | Dingle et al. |
| 2008/0022658 A1 | 1/2008 | Viola et al. |
| 2008/0022659 A1 | 1/2008 | Viola et al. |
| 2008/0031793 A1 | 2/2008 | DiFrancesco et al. |
| 2008/0060348 A1 | 3/2008 | Robel et al. |
| 2008/0066455 A1 | 3/2008 | Viola et al. |
| 2008/0250774 A1 | 10/2008 | Solbrig |
| 2008/0250778 A1 | 10/2008 | Solbrig |
| 2008/0295499 A1 | 12/2008 | Driscoll et al. |
| 2009/0214397 A1 | 8/2009 | Shirono et al. |
| 2009/0272099 A1 | 11/2009 | Garimella et al. |
| 2009/0272101 A1 | 11/2009 | Wills et al. |
| 2009/0272104 A1 | 11/2009 | Garimella et al. |
| 2009/0272105 A1 | 11/2009 | Chi et al. |
| 2009/0301066 A1 | 12/2009 | Sindano et al. |
| 2010/0024390 A1 | 2/2010 | Wills et al. |
| 2010/0024393 A1 | 2/2010 | Chi et al. |
| 2010/0024397 A1 | 2/2010 | Chi et al. |
| 2010/0028230 A1 | 2/2010 | Gady et al. |
| 2010/0043404 A1* | 2/2010 | Hebbale et al. .............. 60/286 |
| 2010/0122526 A1 | 5/2010 | VanderVeen et al. |
| 2010/0229531 A1 | 9/2010 | Chi et al. |
| 2010/0242438 A1* | 9/2010 | Mital .............. 60/274 |
| 2010/0242440 A1 | 9/2010 | Garimella et al. |
| 2011/0058999 A1 | 3/2011 | Ettireddy et al. |
| 2011/0262329 A1 | 10/2011 | Ofoli et al. |

FOREIGN PATENT DOCUMENTS

| | | |
|---|---|---|
| EP | 1129278 B1 | 8/2003 |
| EP | 1083979 B1 | 6/2004 |
| EP | 1431533 | 6/2004 |
| EP | 1339955 B1 | 8/2005 |
| EP | 1609977 A2 | 12/2005 |
| EP | 1672192 A1 | 6/2006 |
| EP | 1712764 A1 | 10/2006 |
| EP | 1431533 B1 | 6/2007 |
| JP | 10118492 A | 5/1998 |
| JP | 10288030 A | 10/1998 |
| JP | 2002-327617 | 11/2002 |
| JP | 2004100700 | 4/2004 |
| JP | 2007255367 | 10/2007 |
| KR | 10-2001-0043138 | 5/2001 |
| KR | 1020030034139 | 5/2003 |
| KR | 1020080030163 A | 4/2008 |
| KR | 1020100061145 | 11/2008 |
| WO | 99/55446 | 11/1999 |
| WO | 02014657 A1 | 2/2002 |
| WO | 04000443 A1 | 12/2003 |
| WO | 2006000877 A3 | 1/2006 |
| WO | 2007-066502 A1 | 6/2007 |
| WO | 2007014649 A1 | 8/2007 |
| WO | 2008009940 A2 | 1/2008 |

OTHER PUBLICATIONS

PCT/US2009/042423, International Search Report and Written Opinion, Nov. 27, 2009.

P.R. Ettireddy et al. "Surface characterization studies of TiO2 supported manganese oxide catalysts for low temperature SCR of NO with NH3" Applied Catalysis B, 76 (2007).

D.A. Pena, et al. "Identification of Surface Species on Titania-Supported Manganese, Chromium, and Copper Oxide Low-Temperature SCR Catalysts": Journal of Physical Chemistry B, 108 (2004) 9927-9936.

Control of a Urea SCR Catalytic Converter System for a Mobile Heavy Duty Diesel Engine—C.M. Schar, C.H. Onder, H.P. Geering and M. Elsener—SAE 2003-01-0776, Mar. 3-6, 2003.

PCT/US2009/067023, International Search Report and Written Opinion, Jul. 13, 2010.

PCT/US2009/042409, International Search Report and Written Opinion, Nov. 25, 2009.

PCT/US2009/067020, International Search Report and Written Opinion, Jul. 13, 2010.

PCT/US2010/048502, International Search Report and Written Opinion, May 23, 2011.

PCT/US2009/042406 International Search Report and Written Opinion, Dec. 18, 2009.

PCT/US2009/042412 International Search Report and Written Opinion, Dec. 16, 2009.

PCT/US2009/042321 International Search Report and Written Opinion, Dec. 14, 2009.

PCT/US2009/042335 International Search Report and Written Opinion, Dec. 14, 2009.

PCT/US2009/042330 International Search Report and Written Opinion, Dec. 17, 2009.

PCT/US2009/042340 International Search Report and Written Opinion, Dec. 16, 2009.

U.S. Appl. No. 12/433,600 Notice of Allowance.
U.S. Appl. No. 12/112,500 Office Action.
U.S. Appl. No. 12/112,500 Notice of Allowance.
U.S. Appl. No. 12/112,622 Office Action.
U.S. Appl. No. 12/112,622 Notice of Allowance.

U.S. Appl. No. 12/112,678 Office Action.
U.S. Appl. No. 12/112,678 Final Office Action.
U.S. Appl. No. 12/112,795 Office Action.
U.S. Appl. No. 12/433,705 Office Action.
U.S. Appl. No. 12/112,678 Notice of Allowance.
Chinese Patent Application No. 200980115540.1 Office Action mailed Jun. 26, 2012.
U.S. Appl. No. 12/632,646 Notice of Allowance mailed Jun. 4, 2012.
U.S. Appl. No. 12/433,586 Notice of Allowance mailed Jul. 12, 2012.
U.S. Appl. No. 12/767,664 Office Action mailed Aug. 3, 2012.
U.S. Appl. No. 12/433,767 Notice of Allowance mailed Aug. 3, 2012.
U.S. Appl. No. 12/879,776 Office Action mailed Dec. 14, 2012.
U.S. Appl. No. 12/632,628 Notice of Allowance.
U.S. Appl. No. 12/433,586 Office Action.
U.S. Appl. No. 12/632,628 Office Action.
U.S. Appl. No. 12/112,795 Notice of Allowance.
U.S. Appl. No. 12/433,705 Notice of Allowance.
U.S. Appl. No. 12/433,767 Office Action.
PCT/US2011/033767 International Search Report and Written Opinion, Feb. 8, 2012.

* cited by examiner

ENGINE SYSTEM PROPERTIES CONTROLLER

FIELD

This disclosure relates to an exhaust properties controller for an internal combustion engine, and more particularly to an engine systems controller for an internal combustion engine coupled with an exhaust aftertreatment system.

BACKGROUND

Emissions regulations for internal combustion engines have become more stringent over recent years. The regulated emissions of $NO_x$ and particulates from internal combustion engines are low enough that in many cases the emissions levels cannot be met with improved combustion technologies. Therefore, the use of aftertreatment systems on engines to reduce emissions is increasing. Typical aftertreatment systems can include an oxidation catalyst, a particulate matter (PM) filter, a selective catalyst reduction (SCR) system, and an ammonia oxidation (AMOX) catalyst. The oxidation catalyst is used for reducing liquid hydrocarbons (e.g., soluble organic fraction (SOF)) in the exhaust gas stream. The PM filter is used to filter particulate matter from the exhaust gas stream. The SCR system is used to reduce $NO_x$ in the exhaust gas stream. The AMOX catalyst is used to reduce unused ammonia remaining in the exhaust gas stream after treatment by the SCR system.

The performance of aftertreatment systems are dependent upon the physical and chemical properties of the exhaust gas delivered from an internal combustion engine. The physical and chemical properties of exhaust gas are at least partially based on the engine control system's control of combustion, air-handling, and fuel. In typical systems, the engine control system, and thus the properties of exhaust delivered by an engine, does not consider the performance of the aftertreatment system in controlling the properties of the exhaust delivered by the engine. Rather, exhaust properties are controlled by the engine's control system based upon considerations exclusive of aftertreatment system performance. Accordingly, the components of conventional aftertreatment systems are configured to react to the physical and chemical properties of the exhaust gas according to desired exhaust emission targets. Often, the reactionary nature of conventional aftertreatment systems reduces the efficiency and performance of the aftertreatment system because of the transitory nature of combustion engines and inherent delays associated with broad post-combustion adjustment of the properties of the aftertreatment systems.

For example, SCR systems generate ammonia to reduce the $NO_x$. When just the proper amount of ammonia is available at the SCR catalyst under the proper conditions, the ammonia is utilized to reduce $NO_x$. However, if the reduction reaction rate is too slow, or if there is excess ammonia in the exhaust, ammonia can slip out the exhaust pipe. Further, conventional SCR systems that utilize injected urea to produce ammonia must account for potential delays in the vaporization and hydrolysis of urea to ammonia. Additionally, SCR systems that utilize urea dosing to generate ammonia depend upon the real-time delivery of urea to the SCR catalyst as engine $NO_x$ emissions emerge. Urea dosers have relatively slow physical dynamics compared to other chemical injectors such as hydrocarbon injectors. Therefore, post-combustion adjustments in urea dosing can be delayed due to the urea doser dynamics of conventional SCR controls systems.

The inherent reactionary delays of conventional exhaust aftertreatment control systems are accentuated by transient and unpredicted exhaust properties associated with exhaust aftertreatment systems that do not control the exhaust properties delivered by the engine. Accordingly, a need exists for an exhaust aftertreatment control system that manipulates the properties of engine exhaust at least partially through the engine's control system to increase the efficiency and performance of the exhaust aftertreatment system.

SUMMARY

The subject matter of the present application has been developed in response to the present state of the art, and in particular, in response to the problems and needs in the art that have not yet been fully solved by currently available exhaust aftertreatment control systems. Accordingly, the subject matter of the present application has been developed to provide an exhaust properties controller that overcomes at least some shortcomings of the prior art exhaust aftertreatment control systems. For example, in some embodiments, an exhaust aftertreatment control system is described that manipulates the properties of engine exhaust at least partially through the engine's control system to increase the efficiency and performance of the exhaust aftertreatment system.

According to one representative embodiment, an engine system properties controller includes an exhaust aftertreatment system module, a powertrain module, and a combustion module. The exhaust aftertreatment system module is configured to generate an exhaust conditions vector request. The powertrain module is configured to receive the exhaust conditions vector request from the exhaust aftertreatment system module and generate at least one engine operating condition target based on the exhaust conditions vector request. The combustion module configured to receive the at least one engine operating condition target and generate at least one engine controls command based on the at least one engine operating condition target.

In one implementation, the exhaust conditions vector request represents exhaust conditions estimated to facilitate a desired efficiency of an exhaust aftertreatment system.

In another implementation, the exhaust aftertreatment system module includes a selective catalytic reduction (SCR) module configured to generate an exhaust condition request representing exhaust conditions at an inlet of an SCR catalyst that would result in a desired efficiency of the SCR catalyst. Accordingly, the exhaust conditions vector request is generated based on the exhaust condition request generated by the SCR module. Similarly, in another implementation, the exhaust aftertreatment system module includes an oxidation catalyst module configured to generate an exhaust condition request representing exhaust conditions at an inlet of an oxidation catalyst that would result in a desired efficiency of the oxidation catalyst. The exhaust conditions vector request is then generated based on the exhaust condition request generated by the oxidation catalyst module. In yet another implementation, the exhaust aftertreatment system module includes a filter module configured to generate an exhaust condition request representing exhaust conditions at an inlet of a particulate matter filter that would result in a desired efficiency of the particulate matter filter. The exhaust conditions vector request is then generated based on the exhaust condition request generated by the filter module.

According to some implementations, the exhaust conditions vector request is generated based on a plurality of exhaust condition requests each received from a respective one of a plurality of exhaust aftertreatment component modules. Each component module is associated with a respective exhaust aftertreatment component. Further, each exhaust condition request represents exhaust conditions resulting in an optimum performance of the exhaust aftertreatment component associated with the exhaust aftertreatment component module that generated the exhaust condition request. The exhaust aftertreatment system module can generate the exhaust conditions vector request by weighing the plurality of exhaust condition requests.

In some implementations, the powertrain module includes an exhaust conditions optimization module configured to determine the at least one engine operating condition target based on current exhaust properties, a current performance capability of an exhaust aftertreatment system, and an objective factor. The objective factor can include a weighted combination of an estimated cost of operating the exhaust aftertreatment system and an estimated performance of the exhaust aftertreatment system.

According to yet another implementation, the powertrain module includes a performance-based system model module, a cost-based system model module, and an objective factor comparison module. The performance-based system model module is configured to estimate the engine system operating conditions necessary to achieve a maximum performance of the engine system. The cost-based system model module is configured to estimate the engine system operating conditions necessary to operate the engine system at a minimum cost. The objective factor comparison module is configured to determine the at least one engine operating condition target based on a weighted combination of the estimated performance-based operating conditions and the estimated cost-based operating conditions. The weighted combination can be a function of the relative importance of performance versus cost in the operation of the engine system. The relative importance of performance versus cost in the operation of the engine system can be based on user input. Alternatively, or additionally, the relative importance of performance versus cost in the operation of the engine system can be determined automatically.

According to another embodiment, an engine system includes an internal combustion engine, an exhaust aftertreatment system communicable in exhaust receiving communication with the internal combustion engine, and a controller communicable in data receiving communication with the exhaust aftertreatment system and command transmitting communication with the internal combustion engine. The controller is configured to generate an exhaust conditions vector request based on data received from the exhaust aftertreatment system. Additionally, the controller is configured to transmit commands to the internal combustion engine for achieving desired engine output exhaust properties corresponding with the exhaust conditions vector request.

In some implementations of the engine system, the exhaust conditions vector request represents an average of a plurality of exhaust condition requests each associated with exhaust conditions resulting in an optimum performance of a respective one of a plurality of exhaust aftertreatment system components. In yet other implementations, the controller is configured to recalibrate the internal combustion engine in response to the exhaust conditions vector request. According to certain implementations, the controller is configured to modify the exhaust conditions vector request based on at least one of engine system operating cost considerations and engine system operating performance considerations.

In certain implementations, the controller is configured to determine a current exhaust properties vector at each of a plurality of stages along the exhaust aftertreatment system and a current aftertreatment system performance vector based on the current exhaust properties vectors. The exhaust conditions vector request can be based at least partially on the current aftertreatment system performance vector.

In another embodiment, a method for controlling engine system properties can include determining an exhaust conditions vector request from an exhaust aftertreatment system and determining engine operating conditions targets based at least partially on the exhaust conditions vector request and an objective factor. The method further includes commanding at least one engine system component based on the engine operating conditions targets.

According to some implementations, the objective factor is a weighted combination of an engine system operating cost factor and an engine system operating performance factor. The method also includes determining performance-based engine operating conditions targets, determining cost-based operating conditions targets, and weighing the performance-based engine operating conditions targets and cost-based operating conditions targets based on the objective factor. The engine operating conditions targets are determined based at least partially on the weighted performance-based engine operating conditions targets and cost-based operating conditions targets.

In certain implementations, the method also includes interpreting exhaust conditions generated by an internal combustion engine and estimating a desired aftertreatment system performance based on the engine operating conditions targets and the interpreted exhaust conditions. Further, the method can include determining a current performance capability of the exhaust aftertreatment system. Additionally, the method may include modifying the objective factor to reduce the desired aftertreatment system performance if the desired aftertreatment system performance is higher than the current performance capability of the exhaust aftertreatment system.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Figure 1:
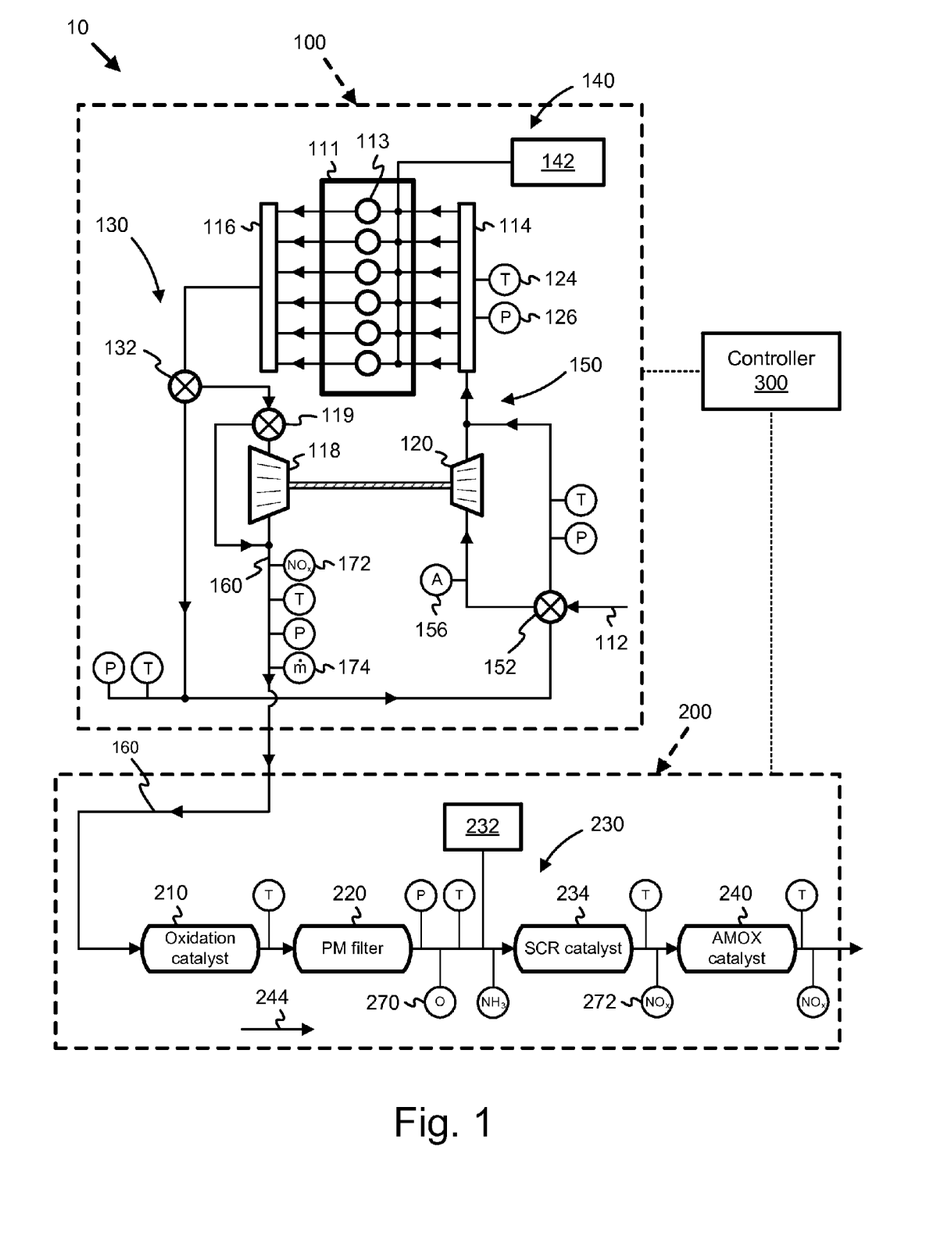
FIG. 1 is a schematic block diagram of an engine system having an exhaust aftertreatment system according to one representative embodiment.

FIG. 1 depicts one embodiment of an internal combustion engine system 10. The main components of the engine system 10 include an internal combustion engine 100, an exhaust gas aftertreatment system 200 coupled to the exhaust output of the engine, and a controller 300.

The internal combustion engine 100 can be a compression ignited internal combustion engine, such as a diesel fueled engine, or a spark-ignited internal combustion engine, such as a gasoline fueled engine operated lean. The engine 100 includes an engine block 111, an air handling system 150 having an air inlet 112, intake manifold 114, EGR system 130, and a fuel delivery system 140 having a fuel supply 142. The engine system 100 also includes an exhaust manifold 116, turbocharger turbine 118, turbocharger compressor 120, temperature sensors (e.g., temperature sensor 124), pressure sensors (e.g., pressure sensor 126), air-flow sensor 156, $NO_x$ sensors (e.g., $NO_x$ sensor 172), and mass flow sensors (e.g., exhaust mass flow sensor 174). The air inlet 112 is vented to the atmosphere and connected to an inlet of the intake manifold 114 to enable air to enter the intake manifold. The intake manifold 114 includes an outlet operatively coupled to the compression chambers 113 of the engine block 111 for introducing intake charge, e.g., air, and EGR gas into the compression chambers. The air handling system 150 may also include a compressor bypass valve 152 that is selectively actuatable to either allow intake air from the air inlet 112, and EGR gas if the valve 132 is opened, to pass through the compressor 120 or bypass the compressor. The fuel delivery system 140 introduces fuel into the cylinders to intermix with the intake charge and EGR prior to a combustion event in the cylinder.

Within the cylinders 113 of the engine block 111, the air from the atmosphere, and EGR gas if desired, is combined with fuel to power the engine. Combustion of the fuel and air produces exhaust gas that is operatively vented to the exhaust manifold 116. From the exhaust manifold 116, a portion of the exhaust gas may be used to power the turbocharger turbine 118. The turbine 118 drives the turbocharger compressor 120, which may compress at least some of the air entering the air inlet 112 before directing it to the intake manifold 114 and into the compression chambers 113 of the engine block 111. The engine 100 also includes a turbine 118 bypass valve 119 selectively opened to allow exhaust gas to power the turbine 118 and selectively closed to bypass the exhaust around the turbine 118 and into an exhaust pipe 160 downstream of the turbine.

The exhaust gas aftertreatment system 200 is coupled to the outlet pipe 160 of the exhaust manifold 116. At least a portion of the exhaust gas exiting the exhaust manifold 116 can pass through the exhaust aftertreatment system 200. As mentioned above, the engine 100 includes the EGR system 130 having an EGR valve 132 configured to open to allow a portion of the exhaust gas to recirculate back into the compression chambers 113 for altering the combustion properties of the engine 100.

Generally, the exhaust gas aftertreatment system 200 is configured to remove various chemical compound and particulate emissions present in the exhaust gas received from the exhaust manifold 116 and not recirculated back into the cylinders 113 of the engine block 111. The exhaust gas aftertreatment system 200 includes an oxidation catalyst 210, a particulate matter (PM) filter 220, an SCR system 230 having a reductant delivery system 232 and an SCR catalyst 234, and an ammonia oxidation (AMOX) catalyst 240. In an exhaust flow direction, indicated by directional arrow 244, exhaust may flow from the exhaust manifold pipe 160, through the oxidation catalyst 210, through the particulate filter 220, through the SCR catalyst 234, through the AMOX catalyst 240, and then be expelled into the atmosphere. In other words, the particulate filter 220 is positioned downstream of the oxidation catalyst 210, the SCR catalyst 234 is positioned downstream of the particulate filter 220, and the AMOX catalyst 240 is positioned downstream of the SCR catalyst 234. Generally, exhaust gas treated in the exhaust gas aftertreatment system 200 and released into the atmosphere consequently contains significantly fewer pollutants, such as diesel particulate matter, $NO_x$, hydrocarbons, such as carbon monoxide and carbon dioxide, than untreated exhaust gas.

The oxidation catalyst 210 can be any of various flow-through, diesel oxidation catalysts (DOC) known in the art. Generally, the oxidation catalyst 210 is configured to oxidize at least some particulate matter, e.g., the soluble organic fraction of soot, in the exhaust and reduce unburned hydrocarbons and CO in the exhaust to less environmentally harmful compounds. For example, the oxidation catalyst 210 may sufficiently reduce the hydrocarbon and CO concentrations in the exhaust to meet the requisite emissions standards.

The particulate filter 220 can be any of various particulate filters known in the art configured to reduce particulate matter concentrations, e.g., soot and ash, in the exhaust gas to meet requisite emission standards. The particulate filter 220 can be electrically coupled to a controller, such as controller 300, that controls various characteristics of the particulate filter, such as, for example, the timing and duration of filter regeneration events. In some implementations, the particulate filter 220 and associated control system is similar to, or the same as, the respective particulate filters and control systems described in U.S. patent application Ser. Nos. 11/227,320; 11/227,403; 11/227,857; and 11/301,998 (hereinafter "incorporated particulate filter applications"), which are incorporated herein by reference.

The SCR system 230 can be similar to the SCR system described in U.S. patent application Ser. No. 12/112,500, filed Apr. 30, 2008, U.S. patent application Ser. No. 12/112,622, filed Apr. 30, 2008, U.S. patent application Ser. No. 12/112,678, filed Apr. 30, 2008, and U.S. patent application Ser. No. 12/112,795, filed Apr. 30, 2008 (hereinafter "incorporated SCR patent applications"), which are each incorporated herein by reference.

For example, the SCR system 230 includes a reductant delivery system 232 that includes a reductant source, pump and delivery mechanism or injector, which are not shown. The reductant source can be a container or tank capable of retaining a reductant, such as, for example, ammonia ($NH_3$), urea, diesel fuel, or diesel oil. The reductant source is in reductant supplying communication with the pump, which is configured to pump reductant from the reductant source to the delivery mechanism. The delivery mechanism can include a reductant injector positioned upstream of the SCR catalyst 234. The injector is selectively controllable to inject reductant directly into the exhaust gas stream prior to entering the SCR catalyst 234. In some embodiments, the reductant can either be ammonia or urea, which decomposes to produce ammonia. The ammonia reacts with $NO_x$ in the presence of the SCR catalyst 234 to reduce the $NO_x$ to less harmful emissions, such as $N_2$ and $H_2O$. The SCR catalyst 234 can be any of various catalysts known in the art. For example, in some implementations, the SCR catalyst 234 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 234 is a zeolite-based catalyst.

The AMOX catalyst 240 can be any of various flow-through catalysts configured to react with ammonia to produce mainly nitrogen. Generally, the AMOX catalyst 240 is utilized to remove ammonia that has slipped through or exited the SCR catalyst 234 without reacting with $NO_x$ in the exhaust. In certain instances, the aftertreatment system 200 can be operable with or without an AMOX catalyst. Further, although the AMOX catalyst 240 is shown as a separate unit from the SCR catalyst 234, in some implementations, the AMOX catalyst can be integrated with the SCR catalyst, e.g., the AMOX catalyst and the SCR catalyst can be located within the same housing.

Figure 2:
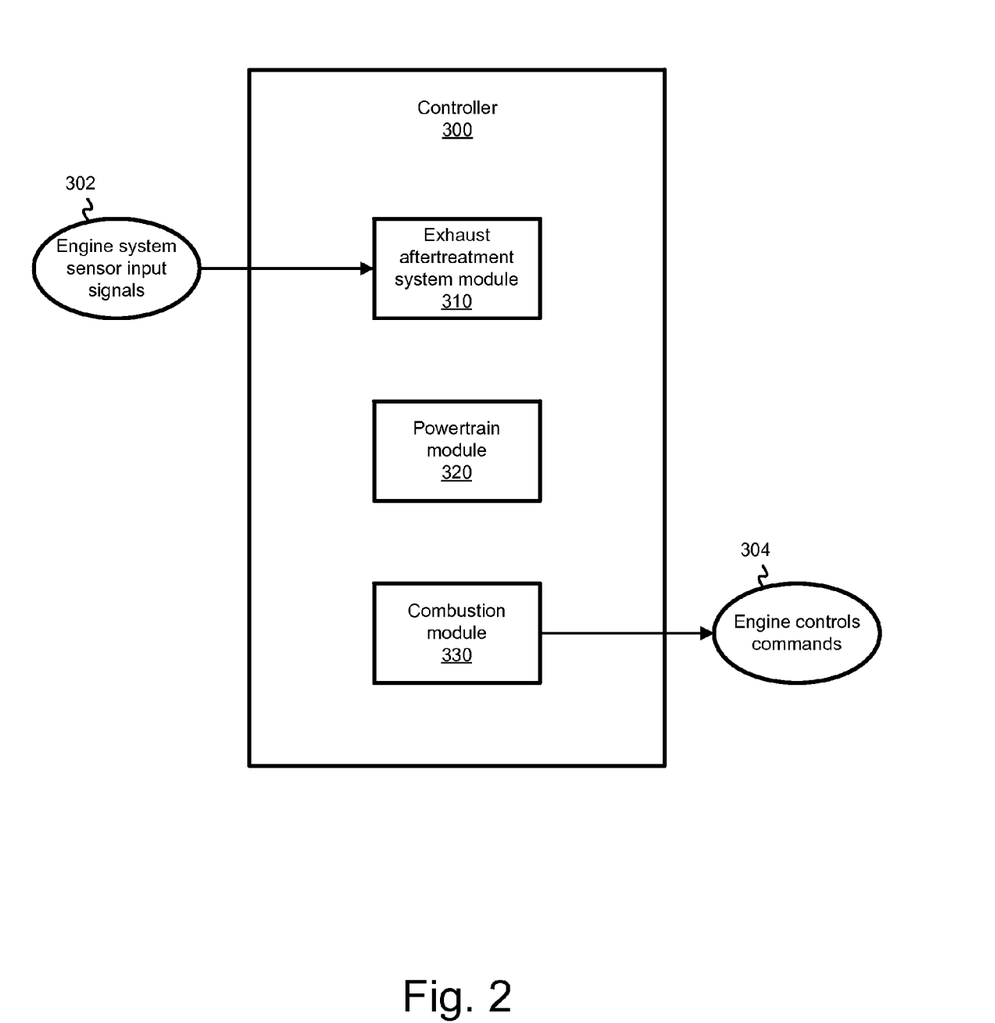
FIG. 2 is a schematic block diagram of a controller of the engine system of FIG. 1 according to one representative embodiment.

As shown in FIG. 2, the exhaust aftertreatment system 200 includes various sensors, such as temperature sensors, pressure sensors, oxygen sensors (e.g., oxygen sensor 270), $NO_x$ sensors (e.g., $NO_x$ sensor 272), $NH_3$ sensors (e.g., $NH_3$ sensor 274), dual ammonia/$NO_x$ sensors (not shown) and the like, that are disposed throughout the exhaust gas aftertreatment system. The various sensors of the exhaust aftertreatment system 200 may be in electrical communication with the controller 300 to monitor operating conditions and control the engine system 10, including the exhaust aftertreatment system 200.

Although the exhaust aftertreatment system 200 shown includes one of an oxidation catalyst 210, particulate filter 220, SCR catalyst 234, and AMOX catalyst 240 positioned in specific locations relative to each other along the exhaust flow path, in other embodiments, the exhaust aftertreatment system may include more than one of any of the various catalysts positioned in any of various positions relative to each other along the exhaust flow path as desired. Further, although the oxidation catalyst 210 and AMOX catalyst 240 shown are non-selective catalysts, in some embodiments, the oxidation and AMOX catalysts can be selective catalysts.

The controller 300 in FIG. 1 is depicted as a single physical unit, but can include two or more physically separated units or components in some embodiments if desired. Generally, the controller 300 receives multiple inputs, processes the inputs, and transmits multiple outputs. The multiple inputs may include sensed measurements from the sensors, virtual sensor inputs, and various user inputs. The inputs are processed by the controller 300 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired exhaust gas emissions at the tailpipe.

Referring to FIG. 2, the controller 300 includes an exhaust aftertreatment system module 310, a powertrain module 320, and a combustion module 330. The controller 300 receives inputs 302 from various sensors of the engine system 10 and generates engine controls commands 304. Generally, the commands 304 are communicated to various components of the engine system 10 and the components actuate according to the commands such that desired operating parameters are achieved. As will be described in more detail below, the commands are based at least partially on desired engine system outputs and exhaust conditions determined by an exhaust conditions optimization module 520 of the powertrain module 320.

Figure 3:
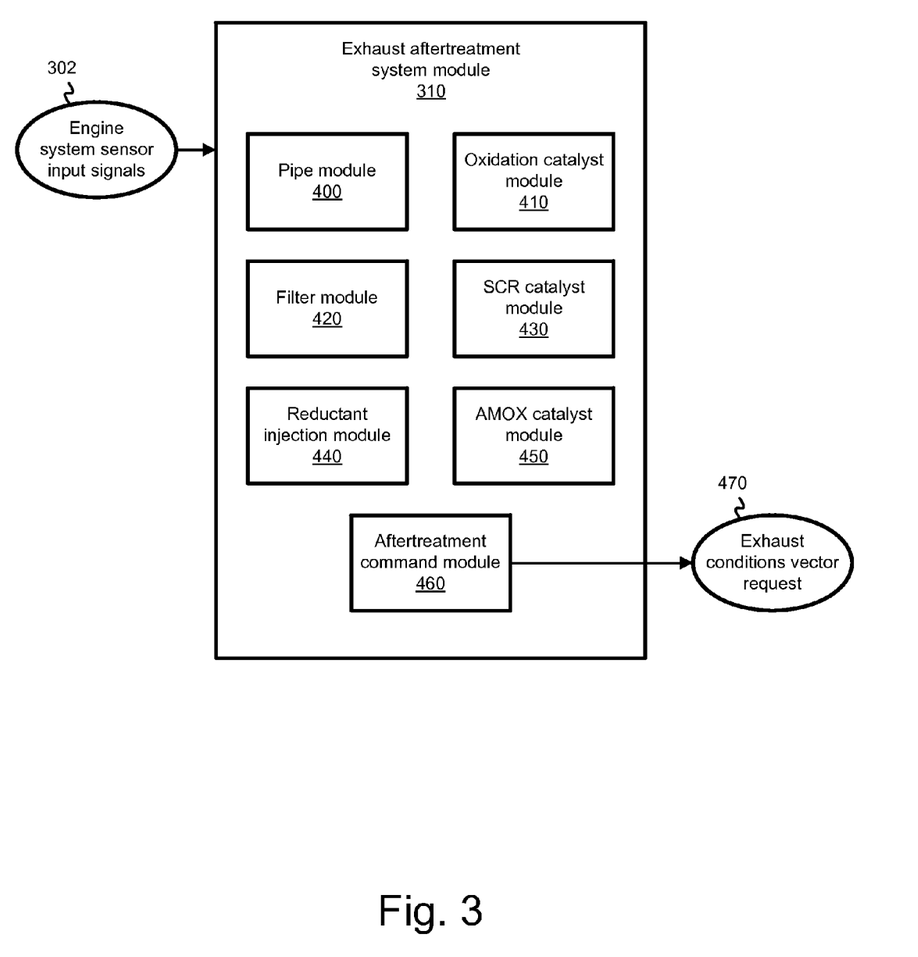
FIG. 3 is a schematic block diagram of an exhaust aftertreatment system module of the controller of FIG. 2 according to one representative embodiment.

Referring to FIG. 3, the exhaust aftertreatment system module 310 includes a pipe module 400, an oxidation catalyst module 410, a filter module 420, an SCR catalyst module 430, a reductant injection module 440, and an AMOX catalyst module 450. Each module receives input signals 302 from various sensors of the engine system 10 and interprets the signals to determine various operating conditions of the respective aftertreatment components. Based on the operating conditions, the modules 410, 420, 430, 440, 450 control the respective components of the exhaust aftertreatment system 200.

The pipe module 400 determines the pipe outlet properties of the exhaust gas stream flowing into, out of, and through the pipe 160 by receiving inputs from any of various sensors positioned upstream, downstream, or along the pipe 160. In certain implementations, the pipe module 400 is configured to determine the temperature of exhaust entering the pipe 160, the temperature of exhaust exiting the pipe, and the temperature of the wall of the pipe. In some implementations, the pipe module 400 is configured to generate an exhaust conditions request based on the determined properties of the exhaust gas flowing through the pipe 160.

The oxidation catalyst module 410 reports a condition of the oxidation catalyst 210 to the aftertreatment command module 460 and generates an exhaust condition request representing exhaust conditions that would result in a desired oxidation efficiency of the catalyst.

The filter module 420 controls the timing, duration, and intensity of regeneration events on the PM filter 220 in a manner similar to that described in the incorporated particulate filter applications. In certain instances, the regeneration events on the PM filter 220 are controlled according to the exhaust conditions of the exhaust gas stream. Therefore, the filter module 420 is configured to generate an exhaust condition request representing exhaust conditions that would result in a desired particulate matter filtration efficiency and desired regeneration event characteristics.

The SCR catalyst module 430 and reductant injection module 440 operate cooperatively to control the reduction of $NO_x$ in the exhaust gas stream in a manner similar to that described in the incorporated SCR patent applications. In certain instances, the SCR catalyst module 430 determines the amount of reductant necessary to achieve a desired NOx reduction efficiency and NOx emissions at the tailpipe based at least partially on the exhaust conditions of the exhaust gas stream. Based at least partially on the amount of reductant determined by the SCR catalyst module 430, the reductant injection module 440 controls the injection of reductant into the exhaust gas stream. The SCR catalyst module 430 is configured to generate an exhaust condition request representing desired exhaust conditions that would result in a desired and/or optimum SCR system efficiency and performance. The exhaust condition request generated by the SCR catalyst module 430 may include the desired exhaust conditions exiting an upstream exhaust aftertreatment component, such as a DOC and/or DPF. In certain implementations, the $NO_x$ conversion efficiency of the SCR system 230 may be highest when the exhaust temperature entering the SCR catalyst 234 is about 350° C. and the $NO_2/NO_x$ ratio of the exhaust entering the SCR catalyst is about 0.5. Accordingly, in this implementation, the SCR catalyst module 430 would request these exhaust conditions in an attempt to achieve the highest $NO_x$ conversion efficiency. As will be described in more detail below, the request may be granted or modified by the exhaust conditions optimization module 520 depending on various trade-offs based on the feasibility of the request at least partially in view of the current operating conditions of the engine.

The AMOX catalyst module 450 reports a condition of the AMOX catalyst 240 to the aftertreatment command module 460 and generates an exhaust condition request representing exhaust conditions that would result in a desired ammonia reduction efficiency of the catalyst.

Desirably, each system component module 400, 410, 420, 430, 450 determines an exhaust condition request based on the desired or optimum performance of the corresponding component irrespective of the requests from other modules. For example, the SCR catalyst module 430 generates a request for exhaust conditions associated with optimum performance of the SCR system 230 regardless of exhaust property requests generated by other system component modules. In some embodiments, the requested exhaust conditions are determined based on characteristic performance curves or tables for each of the exhaust aftertreatment components. The characteristic performance curve or table for each component can be obtained experimentally and stored in the controller 300 (e.g., in the corresponding component module of the controller).

Based on the exhaust properties determined by the pipe module 400 and exhaust condition requests received from the modules 400, 410, 420, 430, 450, the aftertreatment command module 460 generates an exhaust conditions vector request 470. The exhaust conditions vector request 470 represents the exhaust conditions estimated to facilitate a desired overall efficiency and performance of the aftertreatment system 200. In more specific implementations, the exhaust conditions vector request 470 represents exhaust aftertreatment system exhaust conditions conducive to meeting or exceeding exhaust emissions standards. Generally, the aftertreatment command module 460 generates the exhaust conditions vector request 470 by weighing, e.g., averaging, exhaust condition requests from the modules 400, 410, 420, 430, 450. The exhaust condition vector request 470 generated by the exhaust aftertreatment system 200 is communicated to the powertrain module 320. As the performance, e.g., efficiency, of the components of the exhaust aftertreatment system 200 are a function of the exhaust conditions, controlling the exhaust conditions based at least partially on the exhaust conditions requested by the exhaust aftertreatment system components as represented by the exhaust conditions vector request 470 promotes the performance of the exhaust aftertreatment system.

Figure 4:
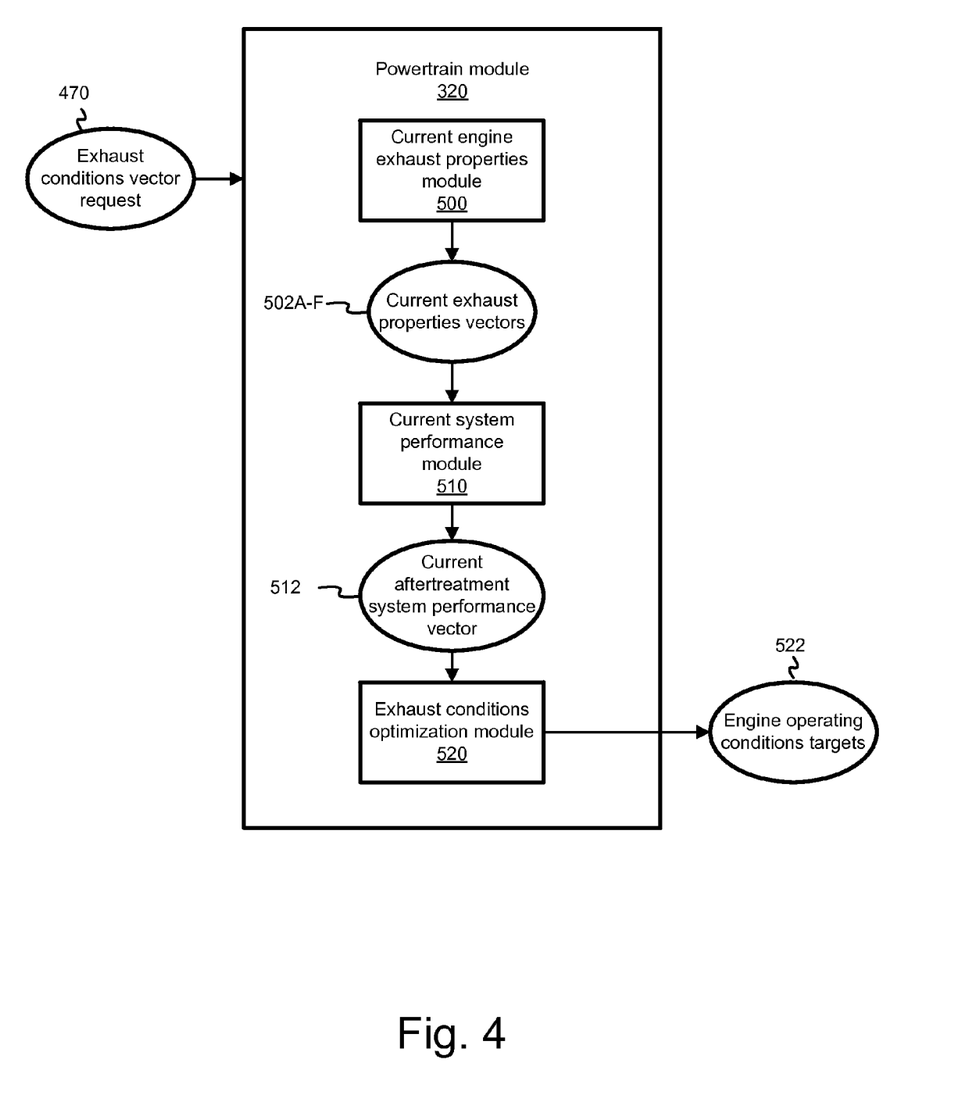
FIG. 4 is a schematic block diagram of a powertrain module of the controller of FIG. 2 according to one representative embodiment.

Referring to FIG. 4, the engine exhaust properties module 500 of the powertrain module 320 is configured to estimate the current conditions of the exhaust flowing into and through the exhaust aftertreatment system 200. More specifically, the engine exhaust properties module 500 estimates the present state of the engine exhaust at various stages of the aftertreatment system 200. The present state of the engine exhaust at each stage can be represented as one of a plurality of current exhaust properties vectors or arrays 502 each including various estimated properties of the exhaust at a respective stage. The various estimated properties of the exhaust can include data concerning specific exhaust properties parameters, such as, for example, exhaust temperature, exhaust mass flow rate, exhaust pressure, and combustion byproduct or mass fractions of various gas species (e.g., NO, $O_2$, UHC, $NO_2$, particulate matter, $SO_2$, $H_2O$, $CO_2$, CO, $H_2$, etc.). The engine exhaust properties module 500 can estimate the various current exhaust properties at each stage via physical sensors, such as described above, from virtual sensors using modeling techniques commonly known in the art, or both.

In operation, the current engine exhaust properties module 500 first determines the exhaust properties vector 502 of the exhaust at a first stage, i.e., the engine exhaust properties vector 502A. The first stage includes the exhaust exiting the engine 100 and entering the pipe 160 of the exhaust aftertreatment system 200. At a second stage, e.g., after the pipe 160 but before the oxidation catalyst 210, the engine exhaust properties vector 502A is updated with the exhaust conditions at the second stage by the current engine exhaust properties module 500 to create a pipe exhaust properties vector 502B. At a third stage, e.g., after the oxidation catalyst 210 but before the PM filter 220, the pipe exhaust properties vector 502B is updated with the exhaust conditions at the third stage by the current engine exhaust properties module 500 to create an oxidation catalyst exhaust properties vector 502C. At a fourth stage, e.g., after the PM filter 220 but before the SCR catalyst 234, the oxidation catalyst exhaust properties vector 502C is updated with the exhaust conditions at the fourth stage by the current engine exhaust properties module 500 to create a filter exhaust properties vector 502D. At a fifth stage, e.g., after the SCR catalyst 234 but before the AMOX catalyst 240, the filter catalyst exhaust properties vector 502D is updated with the exhaust conditions at the fifth stage by the current engine exhaust properties module 500 to create an SCR exhaust properties vector 502E. At a sixth stage, e.g., after the AMOX catalyst 240, the SCR catalyst exhaust properties vector 502E is updated with the exhaust conditions at the sixth stage by the current engine exhaust properties module 500 to create a tailpipe exhaust properties vector 502F. Accordingly, in this manner, the engine exhaust properties vector 502 is continually updated as the exhaust travels from the engine 100 to the tailpipe.

In certain embodiments, the exhaust properties vectors 502A-502F at the various stages along the exhaust aftertreatment system are determined using physical sensors and/or virtual sensors. Physical sensors, such as temperature, pressure, oxygen, ammonia, mass flow, and $NO_x$ sensors, can be strategically placed throughout the exhaust aftertreatment system to directly measure at least some of the exhaust properties of one or more of the vectors. Other exhaust properties, such as $NO_2$, can be determined using virtual sensors based on controls models of component and system performance. The virtual sensors can be embedded in the controller 300 to run in real time.

The system performance module 510 determines a current aftertreatment system performance vector 512 based at least partially on the current exhaust properties vectors 502A-F (e.g., input from the pipe module 400, oxidation catalyst module 410, filter module 420, SCR catalyst module 430, reductant injection module 440, and AMOX catalyst module 450). The current aftertreatment system performance vector 512 represents the maximum operating efficiency or capability of each of the components of the aftertreatment system.

The exhaust conditions optimization module 520 generates engine operating conditions targets 522. The engine operating conditions targets 522 represent the engine operating conditions necessary to achieve desired system outputs, e.g., engine output exhaust properties, and desired system inputs, e.g., exhaust aftertreatment system component inlet and outlet exhaust properties. The engine operating conditions targets 522 are a function of the current exhaust properties (as expressed in the current exhaust properties vectors 502A-F), the current aftertreatment system performance capability (as expressed in the current aftertreatment performance vector 512), the exhaust conditions requested by the exhaust aftertreatment system 200 (as expressed in the exhaust conditions vector request 470), and an objective factor controlling the optimization of the exhaust properties. The objective factor can be any of various factors or combination of factors. For example, in the illustrated embodiments, the objective factor is cost (e.g., cost of fuel and/or urea), performance (e.g., drivability and/or emissions), or combination of both.

In one specific embodiment, the exhaust conditions optimization module 520 generates the engine operating conditions targets 522 by utilizing a control algorithm that compares the current exhaust gas properties with the requested exhaust conditions modified according to the objective factor to determine the desired aftertreatment system performance. The algorithm then compares the desired aftertreatment system performance with the aftertreatment system capability, which can be predetermined and embedded in the controller 300 or determined in real time by the current aftertreatment system performance module 510 of the controller. If the aftertreatment system is capable of achieving the desired aftertreatment system performance, then the controller 300 commands, e.g., recalibrates, the engine system according to the targets 522. But if the aftertreatment system is not capable of achieving the desired aftertreatment system performance, then the objective factor is adjusted to modify the desired aftertreatment system performance to fall within the constraints of the system capability.

Figure 5:
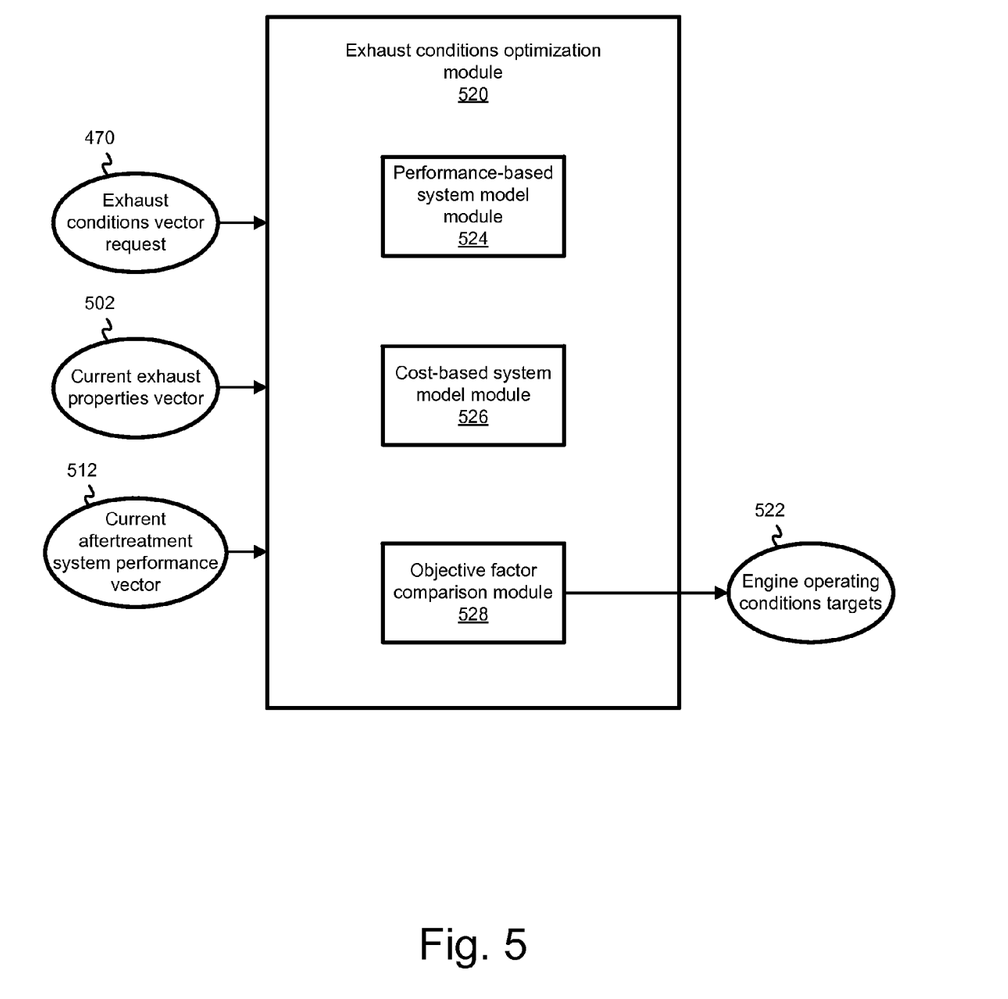
FIG. 5 is an exhaust conditions optimization module of the powertrain module of FIG. 4 according to one representative embodiment.

Referring to FIG. 5, the exhaust conditions optimization module 520 includes a performance-based system model module 524, a cost-based system model module 526, and an objective factor comparison module 528. The performance-based system model module 524 is configured to model the engine system 10 as a function of the performance of the engine system 10. For example, the performance-based system model module 524 can determine the engine system operating conditions necessary to achieve a maximum performance of the engine system 10, e.g., maximum power or torque of the engine and maximum emissions reduction efficiency of the exhaust aftertreatment system 200, while meeting or exceeding emissions standards. The cost-based system model module 526 is configured to model the engine system 10 as a function of the cost to operate the engine system 10. For example, the cost-based system model module 526 can determine the engine system operating conditions necessary to operate the engine system 10 at a minimum cost, e.g., minimum fuel consumption by the engine 100, minimum exhaust fuel injection for regeneration events on the PM filter 220, and minimum reductant for reducing $NO_x$ on the SCR catalyst 234, while meeting or exceeding emissions standards. As used herein, the term "maximum" can also mean "improved" and the term "minimum" can also mean "reduced." In other words, the terms "maximum" and "minimum" do not necessarily mean the extreme upper and lower ends of parameter value ranges.

The performance-based system model module 524 and cost-based system model module 526 each model the engine system 10 to estimate the outputs and inputs of the system 10 based on various engine operating conditions. The outputs of the engine 100 of the engine system include, among other outputs, the exhaust properties, fuel consumption, and power of the engine. The outputs of the exhaust aftertreatment system 200 include, among other outputs, the SCR catalyst bed temperature, the tailpipe NO$_x$, the AMOX catalyst conversion capability, the particulate filter loading, the reductant consumption, and the fuel consumption associated with regeneration events. The above outputs are merely exemplary of any of various desired performance parameters known in the art.

Generally, the operating conditions determined by the modules 524, 526 include the properties required to operate the engine 100 and the properties of the exhaust generated by the engine. The properties required to operate the engine 100 are directly related to the performance of the engine and the cost of operating the engine. The properties of the exhaust are directly related to the performance of the exhaust aftertreatment system 200 and the cost of operating the exhaust aftertreatment system. Because the operation of the engine 100 directly affects the properties of the exhaust, the operating conditions for operating the engine 100 are controlled not only for achieving desired outputs in view of the operating cost and/or performance of the engine, but for achieving desired exhaust conditions in view of the operating cost and/or performance of the exhaust aftertreatment system 200 as well.

The objective factor comparison module 528 is configured to determine the relative importance of cost versus performance in the operation of the engine system 10. Moreover, the objective factor comparison module 528 determines the engine operating conditions targets 522 based on the results of the comparative importance of cost versus performance. For example, if the comparison module 528 determines that cost is the only consideration, then the engine operating conditions targets 522 are calculated by the exhaust conditions module 520 to represent the operating conditions determined by the cost-based system model module 526. In contrast, if the comparison module 528 determines that performance is the only consideration, then the engine operating conditions targets 522 represent the operating conditions determined by the performance-based system model module 524.

Alternatively, the comparison module 528 may determine that both cost and performance are important. In such instances, the importance of each of cost and performance are weighted according to their respective level of importance. The engine operating conditions targets 522 would be a weighted average of the operating conditions determined by the cost-based system model module 526 and the performance-based system model module 524. In one specific example, the cost of operating the engine system may be 25% of the total importance and the performance of the engine may be 75% of the total importance. Therefore, the performance-based operating conditions would have more effect on the operating conditions targets 522 than the cost-based operating conditions, e.g., by a ratio of 3-to-1.

In certain implementations, the relative importance of cost versus performance is determined manually. For example, an operator of the engine system 10 can manually choose to operate the engine system for maximum performance or minimum cost, such as by switching an on-board switch or engaging another type of user interface. In some implementations, the relative importance of cost versus performance can be determined automatically without operator input via application of a simple regression model algorithm based on various operating parameters, such as current or future driving conditions, fuel cost, reductant cost, engine type, driving loads, emissions standards, ambient environment conditions in which an engine will be operated, customer preferences for a vehicle or vehicle fleet, etc. Alternatively, an appropriate trade-off between cost and performance for an engine family could be determined before an engine of the engine family is in operation based on predicted duty cycles of the engine family and/or customer input.

Referring back to FIG. 2, the combustion module 330 generates the engine controls commands 304 based on the engine operating conditions targets 522. As described above, the commands 304 are communicated to various components of the engine system 10 and the components actuate in response to the commands to produce the engine operating conditions targets 522. The commands 304 can be any of various commands corresponding to any of various components. For example, the commands 304 include an air intake handling command, a fuel injection command, an EGR system command, a turbine bypass valve command, and a compressor bypass valve command. The air intake handling command instructs the intake manifold to regulate the amount of air entering the cylinders 113 according to a commanded air intake flow rate. The fuel injection command instructs the fuel injector mechanisms to achieve desired fuel-related operating conditions, such as fuel injection rate, main injection timing, rail pressure, pilot fueling, pilot timing, post fueling, and post timing. The EGR system command instructs the EGR valve 132 to regulate the amount of EGR gas entering the cylinders 113 according to a commanded EGR gas flow rate. The turbine bypass valve command instructs the bypass valve 119 to regulate the amount of exhaust flowing through the turbine according to a commanded turbine exhaust flow rate. The compressor bypass valve command instructs the bypass valve 152 to regulate the amount of air and EGR gas flowing through the compressor according to a commanded compressor exhaust flow rate. In other implementations, the commands 304 can include any of various other commands for controlling any of various other engine system components affecting the engine output and exhaust properties.

Figure 6:
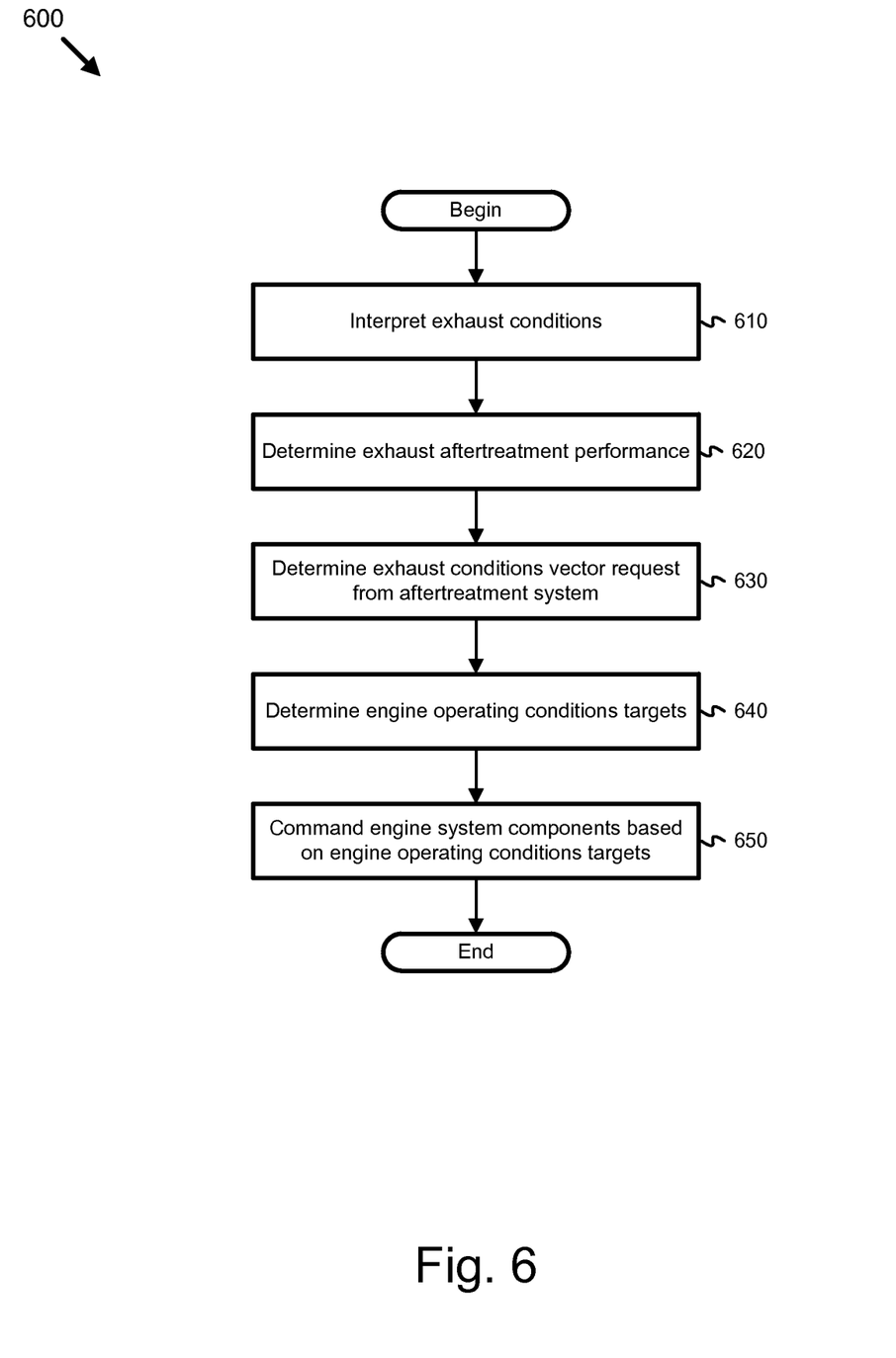
FIG. 6 is a schematic flow chart diagram of a method for controlling the operating conditions of the engine system of FIG. 1 according to one representative embodiment.

Referring to FIG. 6, a method 600 for controlling the operating properties of an engine system having an exhaust aftertreatment system can include interpreting 610 the current conditions of exhaust generated by the engine 100. The method 600 includes determining 620 the current performance of the aftertreatment system 200. Additionally, the method 600 includes determining 630 an exhaust conditions vector request from the aftertreatment system 200 that would result in tailpipe exhaust conditions in compliance with emissions regulations. Based at least partially on the exhaust conditions vector request, the method 600 determines 640 engine operating conditions targets. Additionally, the method 600 commands 650 various components of the engine system 10 based on the engine operating conditions targets.

Figure 7:
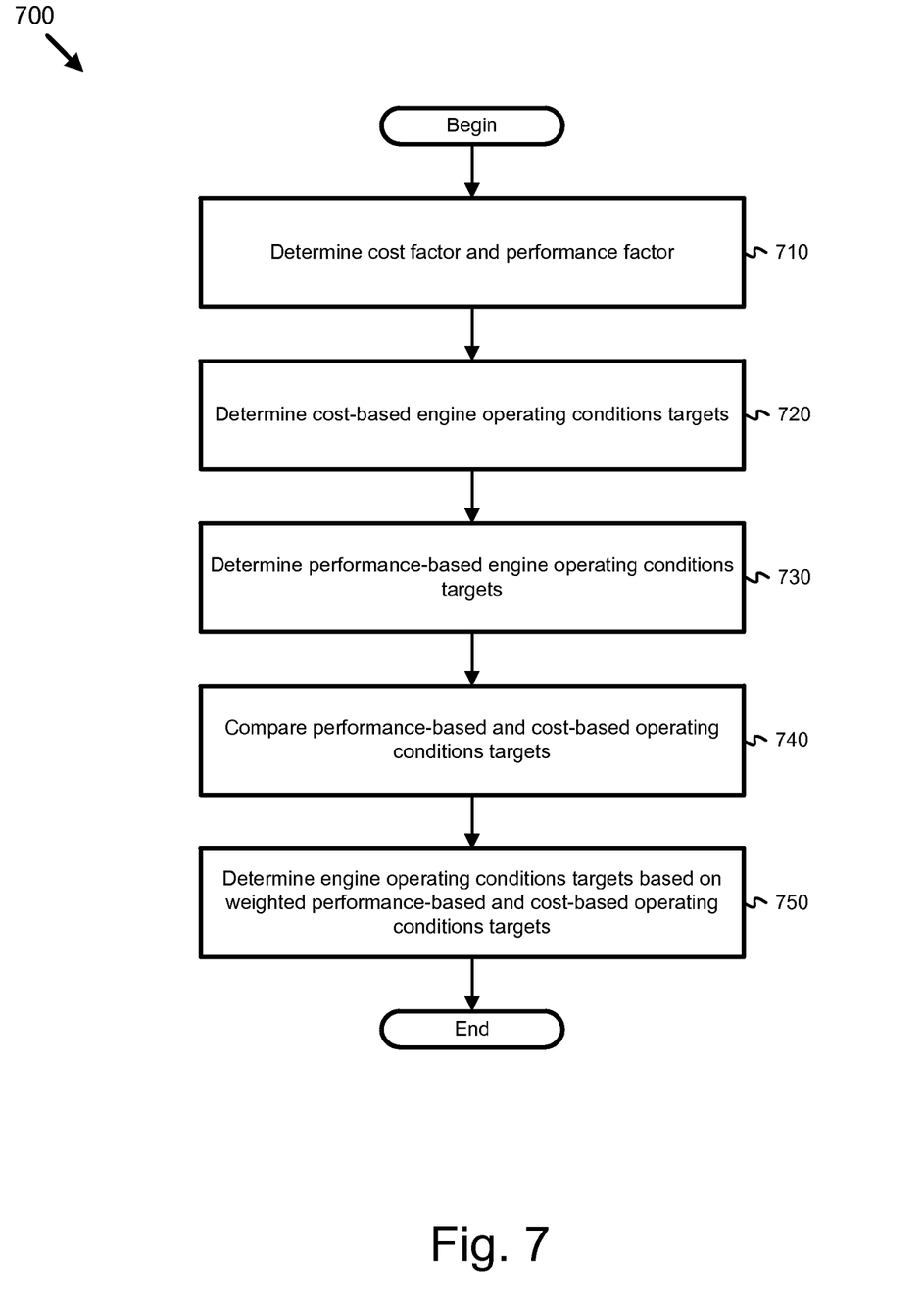
FIG. 7 is a schematic flow chart diagram of a method for determining engine operating conditions targets based at least partially on the relative importance of the cost of operating the engine system of FIG. 1 and the performance of the engine system of FIG. 1.

According to one specific embodiment shown in FIG. 7, a method 700 for determining the engine operating conditions targets includes determining 710 a cost factor and a performance factor. The cost and performance factors can represent the relative importance of controlling the cost of operating the engine system 10 and the performance of the engine system. The method 700 continues with determining 720 cost-based engine operating conditions targets and determining 730 performance-based engine operating conditions targets. The cost-based engine operating conditions targets represent the operating conditions of the engine system that result in the lowest engine system operating costs while meeting or exceeding regulated exhaust emissions standards. Similarly, the performance-based engine operating conditions targets represent the operating conditions of the engine system that result in the highest engine system performance while meeting or exceeding regulated exhaust emissions standards.

The method 700 continues by weighing 740 the performance-based engine operating conditions targets against the cost-based engine operating conditions targets according to a comparison between the cost and performance factors. In some embodiments, the weighting between performance-based and cost-based targets can be represented by a performance-to-cost ratio, or any other comparative indicator. In one embodiment, the performance-to-cost ratio can be 0.5. In other embodiments, the performance-to-cost ratio can be more or less than 0.5. Generally, the performance-to-cost ratio can be determined based on any of various factors as discussed above using any of various techniques, such as a simple estimate or a complex algorithm. In one particular implementation, the performance-based and cost-based engine operating conditions targets are weighted by comparing the amount of fuel and/or urea remaining in the respective on-board tanks with the current market price of fuel and urea, as well as the need for the engine to produce a high power output for a particular application. In another particular implementation, the relative importance between performance-based and cost-based targets can be determined using the trade-off relationship between fuel economy and power represented by the following equation:

$$G(bsfc, bmep) = a_1(bsfc - bsfc_{opt}) - a_2(bmep - bmep_{opt})^2 \quad (1)$$

where G is the objective factor function, bsfc is the brake specific fuel consumption, which is a measure of engine fuel economy, $bsfc_{opt}$ is the optimum brake specific fuel consumption, bmep is the brake mean effective pressure, which is a measure of engine power, $bmep_{opt}$ is the optimum brake mean effective pressure, and $a_1$ and $a_2$ are weighting coefficients. The weighting coefficients $a_1$ and $a_2$ represent relative importance of operating the engine system in the cost-based operating mode and performance-based operating mode, respectively.

The method further includes determining 750 engine operating conditions targets based on the weighted performance-based and cost-based operating conditions targets that meets or exceeds the regulated exhaust emissions standards.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An engine system properties controller for controlling an internal combustion engine system, comprising:
    an exhaust aftertreatment system module configured to generate an exhaust conditions vector request representing a demand for the internal combustion engine system to produce exhaust gas having conditions that if produced by the internal combustion engine system are estimated to result in a desired efficiency of an exhaust aftertreatment system of the internal combustion engine system;
    a powertrain module configured to receive the exhaust conditions vector request from the exhaust aftertreatment system module and generate at least one engine operating condition target based on the exhaust conditions vector request; and
    a combustion module configured to receive the at least one engine operating condition target and generate at least one engine controls command based on the at least one engine operating condition target;
    wherein the exhaust aftertreatment system module, powertrain module, and combustion module comprise one or more of logic hardware and non-transitory machine-readable storage media including an executable code.

2. The engine system properties controller of claim 1, wherein the exhaust conditions vector request represents exhaust conditions estimated to meet or exceed exhaust emissions standards.

3. The engine system properties controller of claim 1, wherein the exhaust aftertreatment system module comprises a selective catalytic reduction (SCR) module configured to generate an exhaust condition request representing exhaust conditions at an inlet of an SCR catalyst that would result in a desired NOx reduction efficiency of the SCR catalyst, and wherein the exhaust conditions vector request is generated based on the exhaust condition request generated by the SCR module.

4. The engine system properties controller of claim 1, wherein the exhaust aftertreatment system module comprises an oxidation catalyst module configured to generate an exhaust condition request representing exhaust conditions at an inlet of an oxidation catalyst that would result in a desired oxidation efficiency of the oxidation catalyst, and wherein the exhaust conditions vector request is generated based on the exhaust condition request generated by the oxidation catalyst module.

5. The engine system properties controller of claim 1, wherein the exhaust aftertreatment system module comprises a filter module configured to generate an exhaust condition request representing exhaust conditions at an inlet of a particulate matter filter that would result in a desired particulate matter filtration efficiency of the particulate matter filter, and wherein the exhaust conditions vector request is generated based on the exhaust condition request generated by the filter module.

6. The engine system properties controller of claim 1, wherein the exhaust conditions vector request is generated based on a plurality of exhaust condition requests each received from a respective one of a plurality of exhaust aftertreatment component modules each associated with a respective exhaust aftertreatment component, and wherein each exhaust condition request represents exhaust conditions resulting in an optimum performance of the exhaust aftertreatment component associated with the exhaust aftertreatment component module that generated the exhaust condition request.

7. The engine system properties controller of claim 6, wherein the exhaust aftertreatment system module generates the exhaust conditions vector request by weighing the plurality of exhaust condition requests.

8. The engine system properties controller of claim 1, wherein the powertrain module comprises an exhaust conditions optimization module configured to determine the at least one engine operating condition target based on current exhaust properties, a current performance capability of an exhaust aftertreatment system, and an objective factor.

9. The engine system properties controller of claim 8, wherein the objective factor comprises a weighted combination of an estimated cost of operating the exhaust aftertreatment system and an estimated performance of the exhaust aftertreatment system.

10. The engine system properties controller of claim 1, wherein the powertrain module comprises a performance-based system model module, a cost-based system model module, and an objective factor comparison module, the performance-based system model module being configured to estimate the engine system operating conditions necessary to achieve a maximum performance of the engine system, the cost-based system model module being configured to estimate the engine system operating conditions necessary to operate the engine system at a minimum cost, and the objective factor comparison module being configured to determine the at least one engine operating condition target based on a weighted combination of the estimated performance-based operating conditions and the estimated cost-based operating conditions, the weighted combination being a function of the relative importance of performance versus cost in the operation of the engine system.

11. The engine system properties controller of claim 10, wherein the relative importance of performance versus cost in the operation of the engine system is based on user input.

12. The engine system properties controller of claim 10, wherein the relative importance of performance versus cost in the operation of the engine system is determined automatically.

13. An engine system, comprising:
an internal combustion engine configured to generate exhaust gas;
an exhaust aftertreatment system communicable in exhaust gas receiving communication with the internal combustion engine, the exhaust aftertreatment system comprising a plurality of exhaust aftertreatment system components; and
a controller communicable in data receiving communication with the exhaust aftertreatment system and command transmitting communication with the internal combustion engine;
wherein the controller is configured to generate an exhaust conditions vector request based on data received from the exhaust aftertreatment system and configured to transmit commands to the internal combustion engine for achieving desired engine output exhaust properties corresponding with the exhaust conditions vector request; and
wherein the exhaust conditions vector request represents an average of a plurality of exhaust condition demands each associated with exhaust conditions that if generated by the internal combustion engine are estimated to result in an optimum performance of a respective one of the plurality of exhaust aftertreatment system components.

14. The engine system of claim 13, wherein the controller is configured to recalibrate the internal combustion engine in response to the exhaust conditions vector request.

15. The engine system of claim 13, wherein the controller is configured to modify the exhaust conditions vector request based on at least one of engine system operating cost considerations and engine system operating performance considerations.

16. The engine system of claim 13, wherein the controller is configured to determine a current exhaust properties vector at each of a plurality of stages along the exhaust aftertreatment system and a current aftertreatment system performance vector based on the current exhaust properties vectors, and wherein the exhaust conditions vector request is based at least partially on the current aftertreatment system performance vector.

17. A method for controlling engine system properties of an internal combustion engine, comprising:
determining an exhaust conditions vector request from an exhaust aftertreatment system, the exhaust conditions vector request representing a demand for the internal combustion engine system to produce exhaust gas having conditions that if produced by the internal combustion engine are estimated to result in a desired efficiency of an exhaust aftertreatment system of the internal combustion engine system;
determining engine operating conditions targets based at least partially on the exhaust conditions vector request and an objective factor; and
commanding at least one engine system component based on the engine operating conditions targets.

18. The method of claim 17, wherein the objective factor is a weighted combination of an engine system operating cost factor and an engine system operating performance factor, the method further comprising:
determining performance-based engine operating conditions targets;
determining cost-based operating conditions targets; and
weighing the performance-based engine operating conditions targets and cost-based operating conditions targets based on the objective factor;
wherein the engine operating conditions targets are determined based at least partially on the weighted performance-based engine operating conditions targets and cost-based operating conditions targets.

19. The method of claim 18, further comprising:
interpreting exhaust conditions generated by an internal combustion engine;
estimating a desired aftertreatment system performance based on the engine operating conditions targets and the interpreted exhaust conditions;
determining a current performance capability of the exhaust aftertreatment system; and
modifying the objective factor to reduce the desired aftertreatment system performance if the desired aftertreatment system performance is higher than the current performance capability of the exhaust aftertreatment system.

* * * * *